Nov. 10, 1953        A. J. ALLETTO        2,658,749
ADJUSTABLE OVERLOAD SPRING DEVICE
Filed May 11, 1951        2 Sheets—Sheet 1
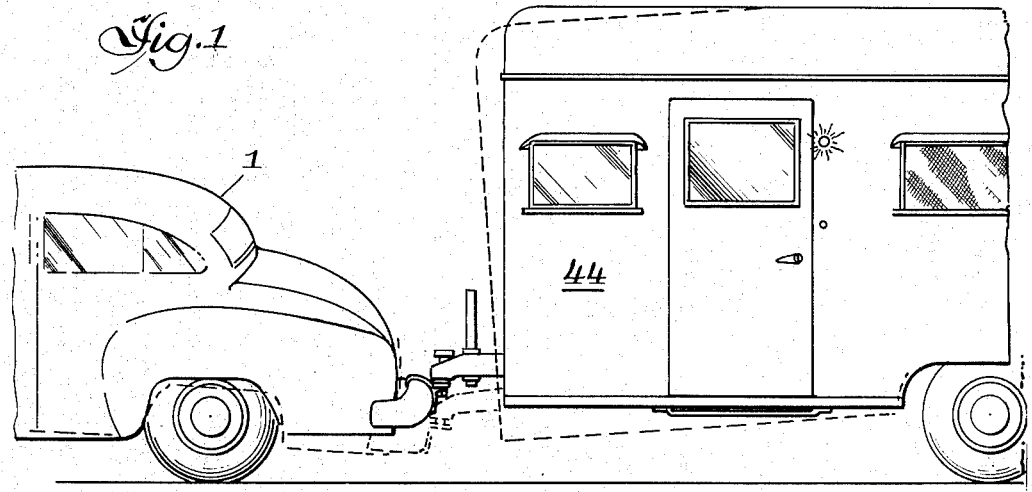
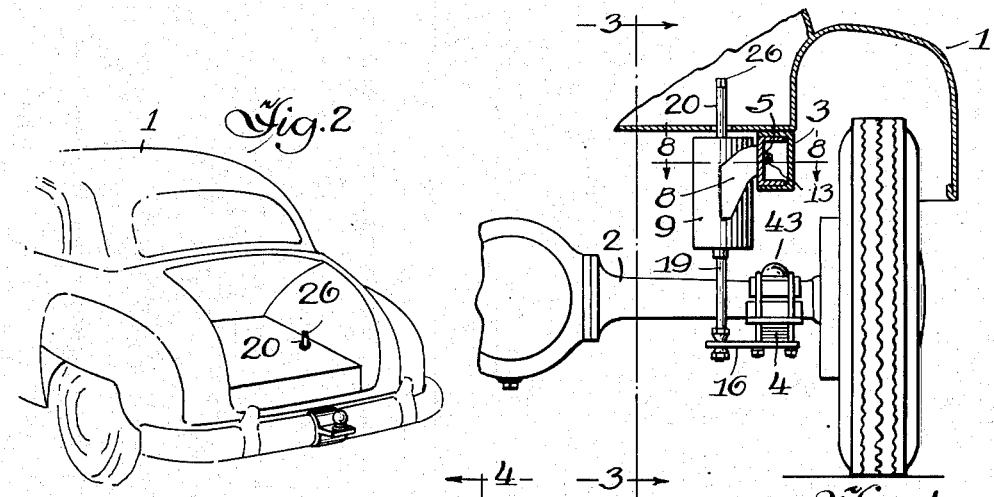
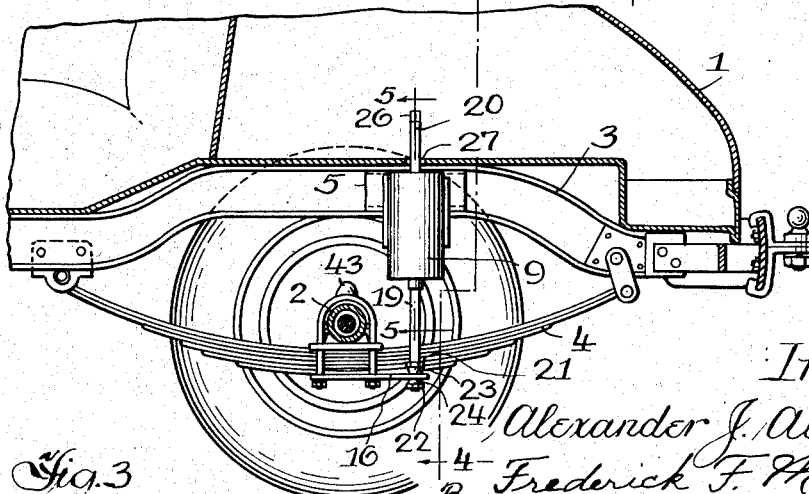
Inventor
Alexander J. Alletto,
By: Frederick F. Mason
Atty.

Nov. 10, 1953  A. J. ALLETTO  2,658,749
ADJUSTABLE OVERLOAD SPRING DEVICE
Filed May 11, 1951  2 Sheets-Sheet 2
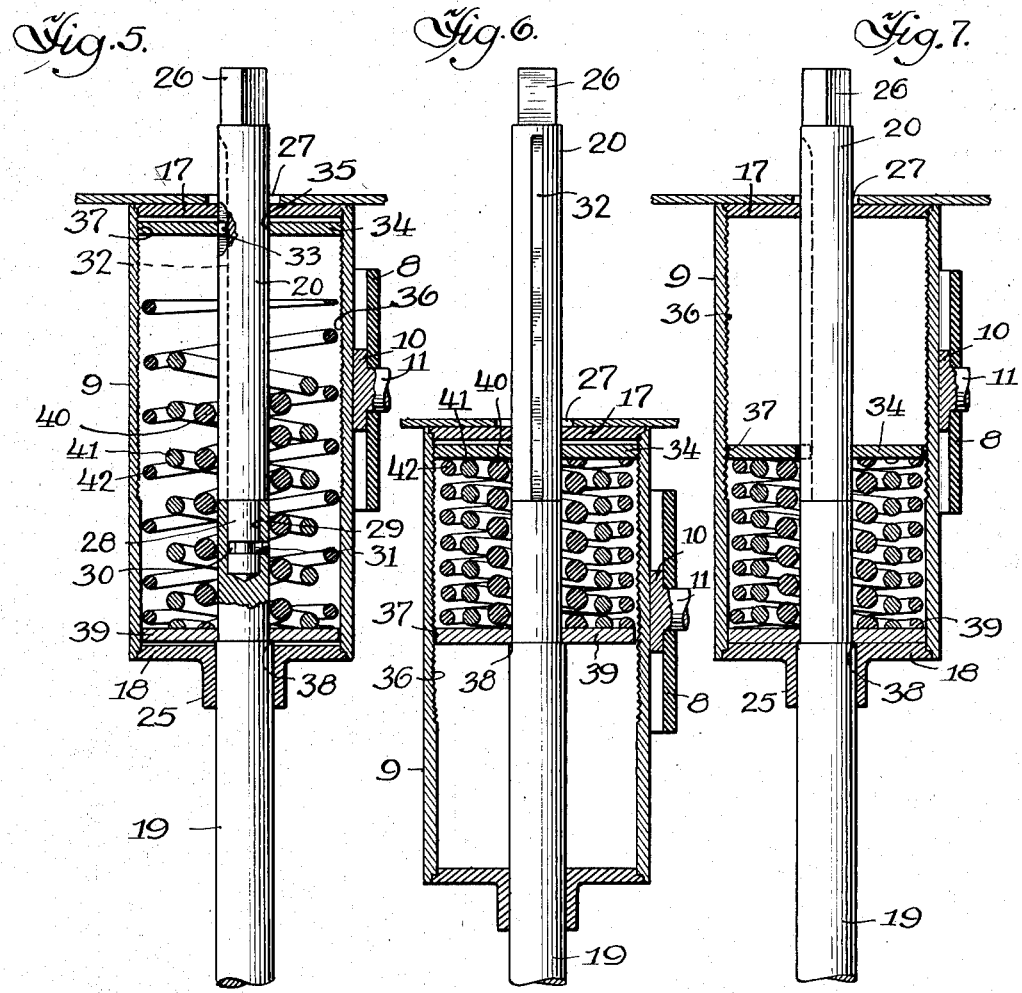
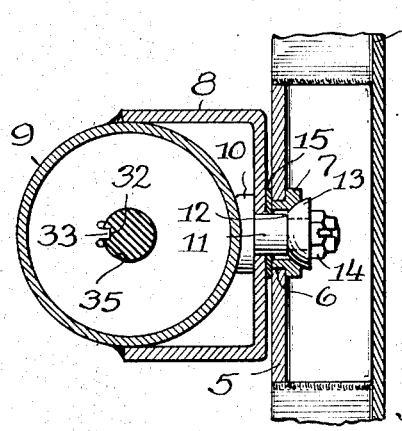
Inventor,
Alexander J. Alletto,
By: Frederick F. Mason
Atty Patented Nov. 10, 1953

2,658,749

UNITED STATES PATENT OFFICE 2,658,749

ADJUSTABLE OVERLOAD SPRING DEVICE

Alexander J. Alletto, Chicago, Ill.

Application May 11, 1951, Serial No. 225,767

6 Claims. (Cl. 267—28)

1

This invention relates to an adjustable overload spring device adapted for use between two spring separated support members and capable of adjustment such as to prevent too great a variation in the distance therebetween under varying loads. While not limited thereto, it is especially adapted for use in automotive vehicles in adjusting for the amount of deflection or compression in the main load carrying springs, so as to be able to bring them back to an approximately normal level regardless of the amount of the load, as in trucks used for carrying heavy loads, automobiles used for pulling trailers, and other instances where such compensation in level is desired. The use of the device in connection with the rear springs of an automobile used for drawing a trailer, has been shown for illustrative purposes only, in the drawings.

As is well known the amount of load on the rear springs of an automobile varies considerably at different times when handling a trailer therebehind. For example a shift of the load in the trailer from rear to fore or vice versa, or the placing of heavy objects such as furniture, refrigerators, and the like fore or aft, or the presence of several passengers in one end or the other without proper distribution, will cause either too much load on the rear springs of the car and bring the frame of the car against the axle housing, or will cause a tendency to lift the rear end of the car too high. In addition to being injurious to the car springs, neither the car nor the trailer will ride as it should. Also when the car springs have been conventionally adjusted to permit a considerable load in the front of the trailer with considerable weight on the rear springs of the car, the disconnecting of the trailer from the car for a trip to town in the car alone, will cause embarrassment by the rear end of the car body riding too high. Also trouble in changing tires can be experienced from improperly loaded trailers, as well as other difficulties that arise from time to time.

In the present invention I have overcome the above difficulties by providing an adjustable overload spring device such as to enable a quick and easy adjustment to level off for any trailer drawbar weight, and in other automotive vehicles adapted to carry heavy loads, as well as other instances not involving automotive vehicles, my device enables a ready adjustment to increase or decrease the distance between two spring separated support members.

Among the objects of my invention are: to provide a new and improved adjustable overload

2 spring device; to provide a device of the type referred to in which easy and quick adjustment may be made when desired to adjust the distance between two spring separated load bearing supports, in order to compensate for different amounts of load thereon; to provide an adjustable overload spring device for the load bearing springs of an automotive vehicle for returning the frame of the vehicle to an approximate normal height under different loads applied thereto; to provide an adjustable overload spring device for the rear body springs of an automobile used for drawing a trailer, such that by easy adjustment said body springs may be brought back to approximately normal height under different loadings in the trailer as well as when the trailer is removed from the automobile; to provide a device of the type referred to which will by easy adjustment be of great assistance in detaching a trailer from a car, in changing a tire, in using the car alone after the trailer is detached therefrom, in equalizing a weak spring, and for compensating for crown of road or laterally inclined roads; and such further objects, advantages, and capabilities inherently possessed by my device, as will later more fully appear.

My invention further resides in the combination, construction, and arrangement of parts illustrated in the accompanying drawings, and while I have shown therein a preferred embodiment, I wish it understood that the same is susceptible of modification and change without departing from the spirit of my invention.

In the drawings:

Fig. 1 is a fragmentary side elevation of the rear portion of an automobile and the front portion of a trailer, and showing in dotted lines the effect of heavy loads in the front of the trailer, and in solid lines the normal position of these parts after adjustment of my present invention.

Fig. 2 is a fragmentary perspective view of the rear end of an automobile showing the upper end of the adjusting rod or post accessible for operation in the luggage compartment.

Fig. 3 is an enlarged, fragmentary, longitudinal, vertical section of the adjustable overload spring device, on the line 3—3 of Fig. 4.

Fig. 4 is a fragmentary, transverse, vertical section on the line 4—4 of Fig. 3.

Fig. 5 is an enlarged fragmentary, transverse, vertical section on the line 5—5 of Fig. 3, and showing the adjustable overload spring device in normal no-load position.

Fig. 6 is a view similar to Fig. 5, but showing the adjustable overload spring device in the position of full load, but before adjustment.

Fig. 7 is a view similar to Fig. 6 but after adjustment to bring the car level back to normal height.

Fig. 8 is an enlarged, fragmentary, horizontal section on the line 8—8 of Fig. 4.

While not limited thereto, my invention is shown for illustrative purposes only, as applied between the axle housing and the frame of an automobile adapted for having a trailer attached thereto, however I wish it understood that it may be used in many other instances where it is desired to adjust spring separated load bearing parts to a normal level or separated position regardless of the amount of load applied thereto. In the form shown in the drawings the automobile 1 is provided with the usual rear axle housing 2, a frame or chassis 3, and springs 4 of any suitable type for resiliently and yieldably mounting the car frame on the axle housing to permit the frame and axle housing to have movement toward and away from each other depending upon the load and road conditions.

Fixed within the channel of the frame 3 is a suitable length of steel channel bar 5 having its flanges welded, or otherwise secured as desired, to the inner faces of the flanges of the frame, and having its web approximately flush with the inner edge of the flanges of the frame, as seen in Figs. 4 and 8. Said web of channel bar 5 is formed with a central hole 6 within which is mounted the neck of a collar 7 formed with an annular flange to bear against the inner face of the web of the channel bar 5, as shown in Fig. 8. Positioned inside of the car frame and slightly spaced from the web of channel bar 5 is a bracket member 8 of channel shape in cross section and extended downwardly at its inner end (see Figs. 4 and 8).

Welded, or otherwise rigidly secured, to the inner edge portions of the flanges of bracket 8 is a spring carrier or housing 9, which in the form illustrated is a cylinder, although it may assume other forms if desired. Positioned between the cylinder 9 and the web of the channel shaped bracket 8, prior to securing these two parts together, is a head 10 of a short shaft 11 which passes through a hole in the web of the bracket and through hole 6 into the space within channel bar 5 where its diameter is reduced to provide a shoulder 12 against which is seated a conical member 13 having a central opening positioned over the reduced diameter of shaft 11 and fixed thereon by a nut 14 threaded onto threads on the shaft 11. The opening in collar 7 directly opposite the conical portion of conical member 13 is formed with a complemental conical surface against which conical member 13 seats with sufficient firmness to prevent looseness but yet permit a slight amount of rotation of shaft 11 with relation to the frame, as well as a slight amount of rocking.

Surrounding shaft 11 and gripped between the adjacent faces of bracket 8 and the web of channel bar 5 is a fiber washer 15, which under substantial force will yield to permit some distortion of the mounting of cylinder 9 when the car springs and their mountings, and the axle housing, are unduly distorted or moved with relation to the frame in other than the normal up and down movement of the car springs. Also the short shaft 11 and conical member 13 of the mounting of the bracket on the frame, will permit whatever swinging of the cylinder 9 and bracket 8 may be necessary by forward or rearward movement of the axle housing with relation to the frame, under stress of road conditions. The conical member 13 and shaft 11 will be of any suitable metal, while collar 7 may be of either metal or suitable composition material as desired.

As seen in Figs. 3 and 4, the usual clamping plate under the bottom of the middle of the spring 4, for clamping the spring to the axle housing, is replaced by a strong steel plate 16 which extends rearwardly and laterally inwardly and which is formed with a hole in alinement with the vertical center axis of the cylinder 9. As will be understood in Figs. 5-7, cylinder 9 is closed at its top by a head 17 fixed thereto, and is closed at its bottom by a head 18 fixed thereto. Each of top cylinder head 17 and bottom cylinder head 18 is formed with a central opening in axial alinement with each other for a purpose about to be described. Extending vertically through the center of cylinder 9 is a two-part post, rod, or shaft comprising a bottom stationary part 19 and an upper rotatable part 20, which parts respectively pass through the central opening in the bottom cylinder head 18 and the central opening in the top cylinder head 17.

The bottom end portion of the lower stationary post-part 19 is passed through the hole in the plate 16 and fixed to this plate in a manner to prevent axial movement of the post or rod with relation to the plate, but permit some lateral rocking relative thereto. This connection is effected in the manner shown in Figs. 3 and 4, by threading the lower end of post part 19, and placing a nut 21 above and a nut 22 below plate 16, each of these nuts being tightened against a conical rubber block 23 and 24, respectively, fitted into conical seats formed in plate 16 at opposite ends of the hole through which the post part 19 passes. The conical rubber blocks 23 and 24 are semi-rigid sufficient to hold the post or rod against axial movement, but permit some rocking movement thereof to compensate for various road conditions encountered.

Referring to Figs. 5-7, the bottom cylinder head 18 is formed with a downwardly extending neck 25 through which the hole in this head passes to permit the cylinder 9 to slide axially on post-part 19. The upper post-part 20 is formed at its top with a square or other non-circular end 26 to receive a wrench preferably of the ratchet type, to permit quick and easy rotation of the upper part of the post with relation to the lower part thereof. It is also to be noted that the upper post-part 20 passes upwardly through an opening 27 in the floor of the luggage compartment of the car so as to be readily accessible for application of a ratchet wrench thereto from within the luggage compartment. The upper end of the cylinder 9 is directly underneath the luggage compartment floor.

As will be understood there is one of these adjustable overload spring devices on each side of the rear of the car, but as they are both alike only one of them is being described in detail. There is one for each rear spring unit, but they may be applied to any spring unit desired regardless of location.

The rotatable top post-part 20 is formed at its bottom end with a reduced diameter cylindrical extension 28 rotatably seated in a complemental opening 29 in the top of the bottom post-part 19. Extension 28 is formed with a circumferential groove 30 in which is seated the end of a pin 31 fastened in the adjacent wall of post-part 19, so as to enable the top post-part 20 to be rotated on the bottom post-part 19 but be prevented from longitudinal movement with relation thereto. Formed in one side of top post-part 20, and extending longitudinally therealong from its bottom to near its top square head, is a groove or keyway 32 to slidably receive a projection 33 formed in a pressure plate 34 having a central hole 35 slightly larger than post-part 20 to enable pressure plate 34 to slide therealong.

The inner wall of cylinder 9 is formed, for a substantial portion of its length from the top downwardly, with screw threads 36 within which movably engage complemental threads 37 formed on the marginal edge of pressure plate 34, so that rotation of top post-part 20 will rotate pressure plate 34 with it and move the pressure plate longitudinally of post-part 20 in one direction or the other depending on the direction of rotation.

The upper end portion of lower post-part 19 is slightly reduced in diameter to form a shoulder 38 at a level approximately even, or nearly so, with the upper surface of the bottom cylinder head 18 when the car frame stands at its normal unloaded height. The outside diameter of the upper reduced portion of the lower post-part 19 is the same as the outside diameter of the upper post-part 20. Loosely but firmly resting on shoulder 38 is an abutment plate or disk 39, the outer diameter of which is slightly less than the inner diameter of the cylinder 9, and which has a central hole enough larger than the upper reduced portion of post-part 19 to permit some downward movement of post-part 19 therein should the car tire suddenly drop into a depression or cavity in the roadway, but prevent upward movement of the post-part 19 with relation to the abutment plate 39 when the abutment plate is resting on shoulder 38.

Positioned within cylinder 9 between the abutment plate 39 and the pressure plate 34, and surrounding post-parts 19 and 20, are a number of radially spaced compression coil springs, three in the form shown, which are designated 40, 41, and 42. Spring 40 is stronger than spring 41, and spring 41 is stronger than spring 42. I wish it understood, however, that one or more of such springs may be used as desired, depending upon the strength of the spring or springs used, and the load or loads to be carried.

The cylinder 9 being fixed to the frame 3 by bracket 8 and shaft or bolt 11, against vertical movement but laterally rockable with relation thereto, will under no load stand in the normal position shown in Fig. 5. With a capacity load on the car, the frame thereof will move downwardly and compress the springs 40—42 to move the parts into the position shown in Fig. 6, which would mean that the car frame would be striking, or nearly striking, the rubber bumper block 43 on the axle housing. This overload would not only put an excess strain on the car springs 4, but would also put the car in an undesirable cramped position. To overcome this, all that is necessary is to apply a ratchet wrench to the square head 26 of the post and rotate the upper post-part 20 in the appropriate direction to move the pressure plate 34 downwardly within the cylinder, which will raise the cylinder and car frame into the position shown in Fig. 7, which will bring the car frame back to its normal level. Also any intermediate adjustment may be made as desired. As is clear this will remove the excess strain from the car springs and will position the car frame at its normal or any other desired position.

Should the load on the car rear springs be caused by a trailer 44 shown in Fig. 1, due to an improperly distributed load therein, the overload spring device of the present invention may be easily operated by a ratchet wrench on the square head 26 to rotate the upper post-part 20 in the desired direction to produce the desired level or height of the car, and at the same time provide the proper level for the trailer. Also when disconnecting the trailer draw bar from the car, the rear end of the car, instead of riding too high, can, by manipulation of the rotatably postpart 20 as described above, easily be brought to the desired level for a trip to town or elsewhere without the trailer.

When the cylinder 9 is moved downwardly from the position of Fig. 5 to the position of Fig. 6, and when moved upwardly from the position of Fig. 6 to the position of Fig. 7, the abutment plate 39 will act in effect as a loose piston head with relation to the cylinder, and serve as an abutment or support for the bottom ends of the springs 40—42 which are compressed varying amounts between plates 34 and 39. As stated, this device will be useful in many instances other than in connection with a trailer.

While I have, for illustrative purposes, shown and described my invention as applied to an overload spring device, I wish it understood that it can also be used as the main spring on any or all of the front and rear wheels of an automobile or truck, to replace the present conventional spring or springs which are not adjustable. It is also capable of use in instances other than with automobiles and trucks.

Having described my invention, I claim:

1. An adjustable overload spring device mounted between the axle housing and frame of an automotive vehicle, comprising, a rod fixedly mounted adjacent its bottom end to the axle housing, an abutment plate on said rod and fixed against downward movement thereon, a spring containing cylinder fixed to said frame to move therewith, a pressure disk having threaded engagement with the cylinder for movement up or down therein upon rotation of the disk, and a coil spring compressed between the abutment plate and the pressure disk, whereby upon rotation of the pressure disk the distance between the axle housing and the frame may be varied.

2. A device as claimed in claim 1, including means for selectively rotating said pressure disk in either direction in the cylinder from above the adjacent portion of the frame, whereby the frame may be brought to its normal height with relation to the axle housing regardless of the weight of the load on the vehicle.

3. A device as claimed in claim 2, said means including the rod being formed of two parts held against separation longitudinally but one part rotatable with relation to the other, and the pressure disk being rotatable with the rotatable part of the rod but slidable longitudinally therealong.

4. An adjustable overload spring device for adjusting the height of the frame with relation to the axle housing of an automobile, comprising, a cylinder mounted on said frame for movement therewith, a rod extending through the cylinder and having a non-rotatable part and a rotatable part, the non-rotatable part being secured to said axle housing, an abutment plate slidable in said cylinder and mounted on said non-rotatable part and held against axial movement thereon in one direction but capable of movement in the opposite direction thereon, a pressure plate threadably mounted on the interior of the cylinder for movement therein in an axial direction, said pressure plate being longitudinally slidable on said rotatable part but rotatable therewith, a compression spring between said abutment plate and said pressure plate, said rotatable part extending above the cylinder and having a non-circular upper end, whereby a wrench may be applied to said non-circular upper end for rotating said rotatable part of the rod and the pressure plate for adjusting the height of the car frame with relation to the axle housing regardless of the amount of load on the car.

5. An adjustable overload spring device, comprising, a two-part rod having a non-rotatable part and a part rotatable on but held against axial movement on said non-rotatable part, a spring abutment member on the non-rotatable part, a pressure plate on the rotatable part, compression springs between said plates, said rotatable part having a non-circular portion adapted to receive a wrench for rotating the same and said pressure plate, a cylinder enclosing said abutment member, pressure plate, springs and a portion of each of the rotatable and non-rotatable parts of the rod, said pressure plate being connected to the cylinder for axial adjustment therein and being connected to the rotatable part of the rod for rotation therewith and axial sliding movement thereon.

6. An adjustable overload spring device, comprising, a spring housing adapted to be secured to a first support member, a rod passing through said spring housing and adapted to be secured at one end to a second support member, an abutment plate in one end portion of the spring housing and slidable with relation thereto, a pressure plate adjustably mounted in the other end portion of said housing, a compression spring between said plates, means for adjusting the position of said housing with relation to said plates and spring, said rod having a non-rotatable part and a rotatable part, the abutment plate being mounted on the non-rotatable part, and the pressure plate being mounted on the rotatable part, the pressure plate having threaded connection with the spring housing, and spline connection with the rotatable part of the rod.

ALEXANDER J. ALLETTO.

References Cited in the file of this patent

UNITED STATES PATENTS

| Number | Name | Date |
| --- | --- | --- |
| 1,044,339 | Border | Nov. 12, 1912 |
| 1,078,057 | Mitchell | Nov. 11, 1913 |
| 2,059,434 | Broulhiet | Nov. 3, 1936 |
| 2,563,423 | Samothrakis | Aug. 7, 1951 |

FOREIGN PATENTS

| Number | Country | Date |
| --- | --- | --- |
| 5,168 | Great Britain | 1914 |